Sept. 13, 1966 H. P. QUIRK 3,272,651
PAPER CUTTING DUST COLLECTOR SYSTEM AND METHOD
Filed Oct. 30, 1961 3 Sheets-Sheet 3
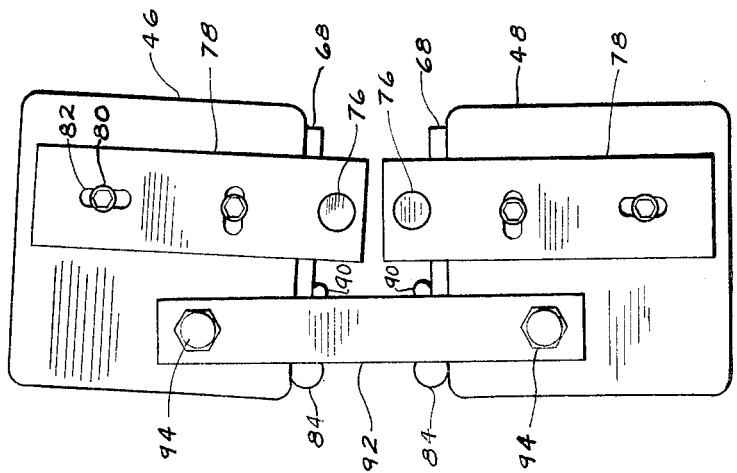
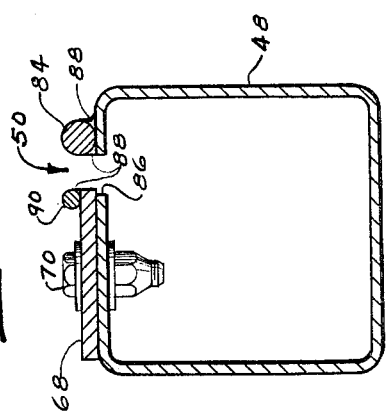
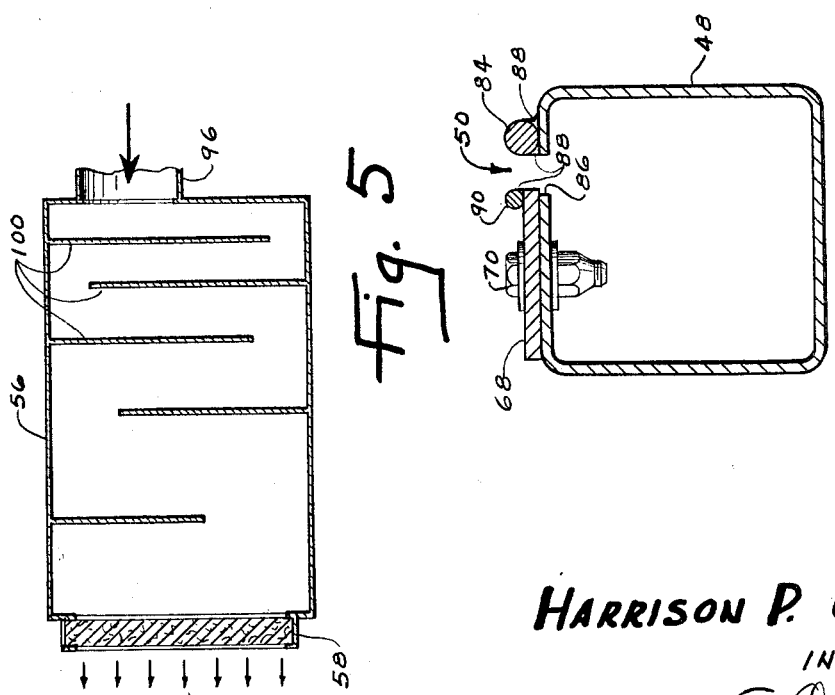
HARRISON P. QUIRK
INVENTOR
Daniel T. Anderson
Nilsson & Robbins
ATTORNEYS

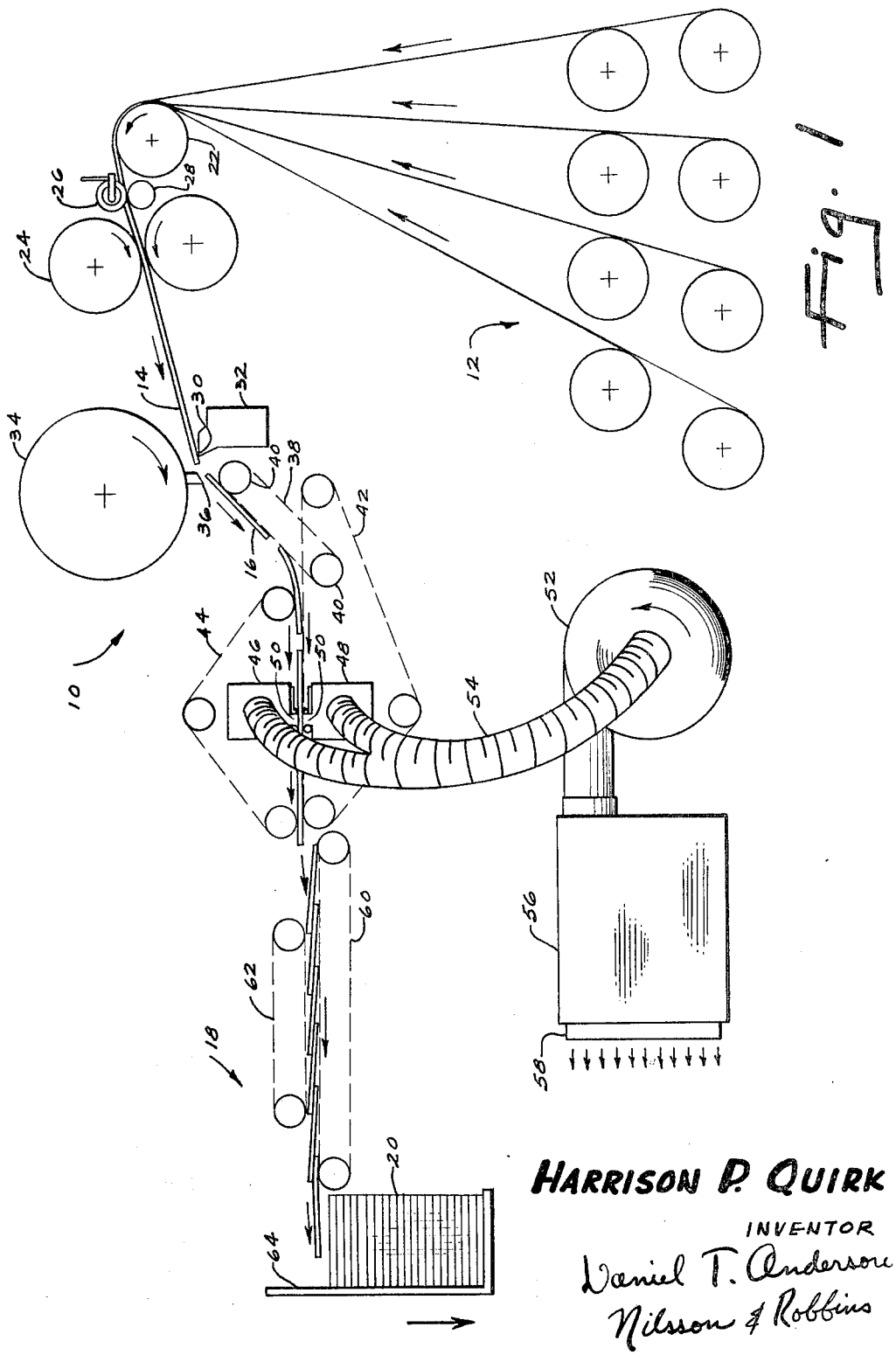

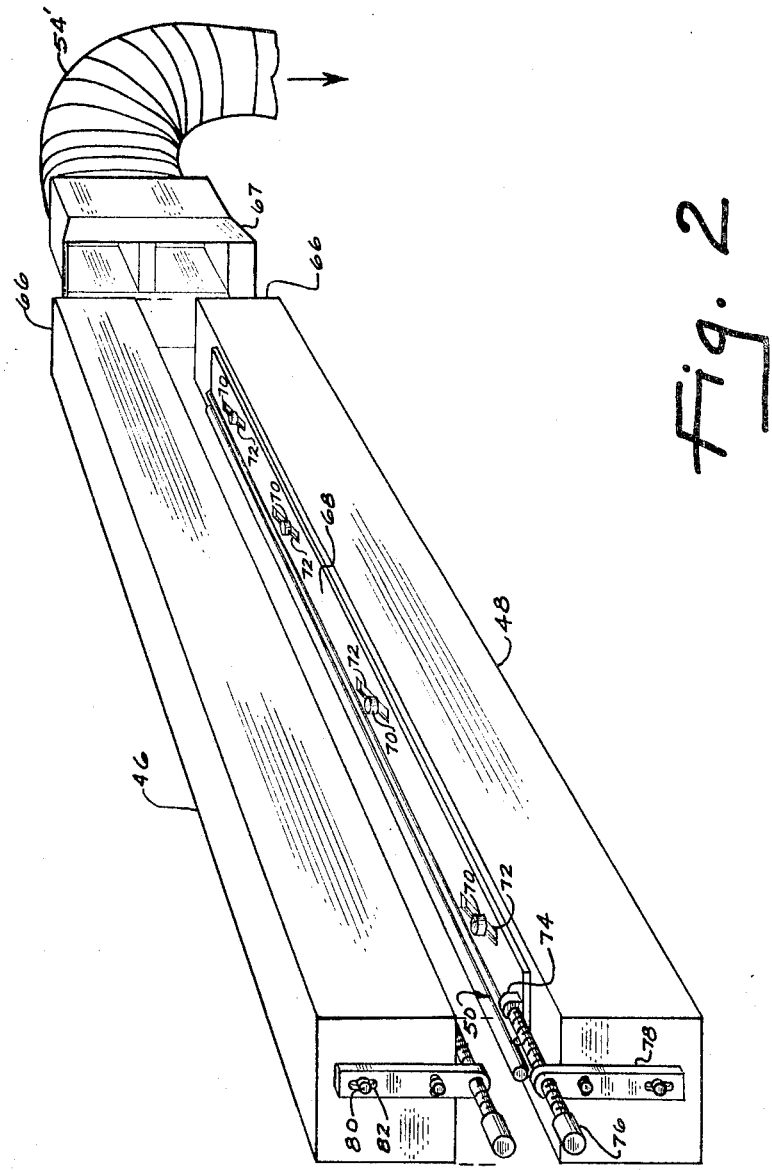

United States Patent Office 3,272,651
Patented Sept. 13, 1966

3,272,651
PAPER CUTTING DUST COLLECTOR
SYSTEM AND METHOD
Harrison P. Quirk, Ypsilanti, Mich., assignor of ten percent to Peninsular Paper Company, Ypsilanti, Mich.
Filed Oct. 30, 1961, Ser. No. 148,505
4 Claims. (Cl. 134—21)

This invention relates generally to supplying and preparing paper for uses such as printing or fabrication and more particularly to a method and system for removing cutter dust from such paper after it has been cut from a continuous web into sheets.

In the paper making industry it is the practice to place the manufactured web of paper large rolls where it may be stored and conveniently handled. When it is desired to supply the paper for a process such as printing, the rolls are mounted on a sheeting cutter backstand. The paper is then unrolled from the rolls on the backstand through the machine, cut into sheet lengths, and stacked by a layboy for shipping or further processing. It is an effective practice to mount a plurality, such as six or eight, of storage rolls on the backstand and combine the web of paper from each of them into effectively a single multisheet web which is fed through the sheeting machine so that each cutting action of the machine provides that plurality of cut sheets.

With the advent of high speed machinery including faster more powerful cutting knives and, particularly in very recent years, the development of new paper pulp making and bleaching processes, the dust from the cutting operations has become a severe problem. In addition to the presence of the various sorts of dust particles ordinarily to be expected in paper handling and cutting operations, the paper fibers and surface sizing particles have been observed actually to explode when impacted by the knife edge and thereby create additional fine particles. The exploded fibers and powders are extremely difficult to detect and to remove from the sheet; however, even though some of this cutter dust is microscopically small it has resulted in considerable and serious difficulties in subsequent printing on the paper. The dust collects on and coats portions of the rubber blankets and transfer rolls and causes the printed product to be blotched and blemished. It also causes additional clean up and down time due to the accumulation of dust in the machinery. In addition it causes the rejection of paper back to the mill where the stacked and packaged paper cannot be economically cleaned and salvaged.

In large measure the severity of the problem is a recent development and prior art cleaning systems do not provide an effective solution. Prior art attempts to provide systems for removing dust have typically been directed toward blowing or brushing or vacuuming the continuous web of paper before it is cut into sheets. Obviously such techniques can remove general dust and lengthwise slitting dust but not the sheet cutting dust nor any other dust which arrives on the sheet after it is cut to length. Such systems not only are not physically adaptable to be placed in the region of the fabric tape conveyor portion of the cutting machine between the cutting knives and the stacking means but also could not remove the microscopic dust from both the sides and the cut ends of the sheets. Similarly, other prior art cleaning systems are either too bulky to be placed in the sheet conveyor region or they rely on brushing or rubbing or blowing the paper surface. To brush or otherwise contact the surface of highly finished paper may deleteriously affect the surface of the paper, misalign the sheets on the conveyor, and intermittently redeposit accumulated dirt back onto the paper.

It is therefore an object of the present invention to provide a paper sheeting cutter dust collector system and method which are not subject to these and other disadvantages of the prior art.

It is another object to provide such a cutter dust collector and method which clean the cut paper just before it is stacked by the cutter layboy.

It is another object to provide such a system which is adaptable to most existing cutting machines whether they are slitting or sheeting cutters or both, and whether they employ overlapping or non-overlapping layboys.

It is another object to provide such a system which does not stir up general area dust and which is versatile.

It is another object to provide such a system which removes cutter dust from the conveyor tapes and from between the tapes and the paper.

It is another object to provide such a system which cleans both sides and the cut ends of the cut paper as it is conveyed toward the stacking layboy.

It is another object to provide such a system which does not require or cause contact with the paper surface.

It is another object to provide such a system which does not redeposit dirt on the paper.

It is another object to provide such a system which does not misalign the multiple sheet conveyance of the cut paper.

In accordance with one aspect of an example of the structure of the present invention, these and other objects are achieved by providing a pair of vacuum headers disposed respectively above and below the path of horizontal travel of the cut sheets between the cutter knives and the layboy stacking means. The headers are each disposed within the perimeter of one of the endless tape conveyors and each extends across the full width of the cut sheets. Each header has an elongated opening disposed near and communicating with one surface and the edges of the paper. The elongated opening is provided with rounded lip portions to permit a substantially turbulence-free flow of air into the vacuum headers from the region of the paper surface and edges.

The lip portions are provided with adjustment means for determining the shape and width of the elongated opening to provide a desired magnitude and distribution of the flux of air along the length of the opening.

The adjustment means is adapted to provide the upper header with a greater magnitude of total flux than the lower header so as to preclude a dead center region of motionless air between the headers along the cut ends of the paper sheets. Such a dead center region with no air flow toward either header would permit dust to remain on the ends of the cut sheets. The lip portions of the upper header are adjusted to provide a greater air flux and velocity than the lower header so that any dead region will occur below the sheets and will not affect the cleaning action and so that gravity will preclude the paper from being lifted toward or contacting the upper header.

Conveying tape speed adjusting means is provided so that after the sheets are cut from the web, their velocity is increased whereby a gap is formed between the cut ends of adjacent sheets on the conveyor system in the region of the vacuum headers. This gap provides a passage for the cleansing air flow across the cut ends of the sheet.

The headers are coupled to air pump means and thence to a dust filter chamber having filter means for collecting cutter dust and baffles for collecting larger scraps of paper and other refuse without impeding the flow of the air from the vacuum headers.

These and other novel features of the invention as well as their principles of operation and additional objects and advantages thereof will become apparent and be best understood from a consideration of the following description taken in connection with the accompanying drawings which are presented by way of example only and in which:

FIG. 1 is an overall schematic diagram of a paper cutter dust collector system constructed in accordance with the principles of the present invention;

FIG. 2 is a partially exploded perspective view of a set of vacuum headers constructed in accordance with one embodiment of the invention;

FIG. 3 is a cross-sectional view of a vacuum header similar to one of the headers of FIG. 2;

FIG. 4 is an end elevational view of a pair of headers similar to those depicted in FIG. 2; and FIG. 5 is a longitudinal sectional view of one example of a refuse and dust collector of the present invention.

Referring to the particular figures, it is stressed that the details shown are by way of example only and are presented in the cause of providing what is believed to be the most useful and readily understood description of the principles of the invention. The detailed showing is not to be taken as a limitation upon the scope of the invention which is to be measured by the appended claims forming a part of this specification.

In FIG. 1 there is illustrated a paper cutting machine 10 which in this example removes paper from an eight roll backstand 12, forms a multilayer web 14, and then slits it and sheets it into multilayer sheets 16 having a predetermined length and width which are finally stacked by a layboy 18 into a large stack 20 for shipping or further processing.

The continuous multilayer web 14 is formed at the lead-in roll 22 where all of the separate webs from each of the rolls of the backstand 12 converge and are driven forwardly together by an entry press 24. Interposed between the lead-in roll 22 and the entry press 24 may be a set of slitters comprising, on each side of the web 14, a rotary disk knife 26 and a mating anvil roller 28. When utilized the slitter knives are driven at an angular velocity such that the peripheral velocity of the disk knives is somewhat greater than the lineal velocity of the web 14. The slitters are spaced by a distance transverse to the web which determines the sheet width. In some applications the rolls on the backstand 12 have previously been cut to width and the slitter knives 26 need not be employed.

The sheeting knives are disposed next after the entry press along the traveling web 14. The multilayer web passes over the cutting edge 30 of a stationary bed-knife 32. A rotary knife cylinder 34 revolving at a predetermined angular velocity has a cutting edge 36 mounted along its length. The cutting edges 36 and 30 extend transversely to the web across its entire width and are mated so that with each revolution of the knife cylinder 34, the traveling web 14 is parted to form a separate set of multilayer sheets 16. Generally the velocity of the web is constant and the angular velocity of the knife 34 is precision adjusted to determine the length of the sheet 16. The shearing action of the cutting edges 36, 30 may be distributed in time across the width of the web.

In such case the mated cutting edges are disposed at a slight angle with respect to the width of the web in order to provide a cutting action which is accurately parallel to the width of the web and thereby form accurately rectangular sheets 16. The magnitude of this angle is computed by simple geometry from the relative velocities of the web 14 and the cylinder 34 and the orientation of the cutting edges 36, 30 on their relative supports.

As each set of sheets 16 is parted from the web, it is conveyed by an endless tape conveyor 38 away from the sheeting knives. This tape conveyor, like the others to be discussed below, comprises a set of fabric tapes which may be approximately 1″ wide and be spaced each from the others by a few inches across the width of the sheets 16. By this cleanable, relatively soft means the paper sheets may be conveyed gently and rapidly and cleanly through the cutter. The tapes are driven by rotating cylinders 40. The tape conveyor 38 is driven at a velocity somewhat greater than that of the web 14. In this manner each of the sets of sheets 16 is pulled away from a subsequent set to form a gap between successive sets of sheets for purposes of preventing damage to the cut ends of the sheets and for cleansing purposes which will be discussed below.

The individual tapes of the conveyor 38 are interspersed laterally between the separate tapes of a second tape conveyor 42 which is the lower of a pair of conveyors, the upper one of which is designated conveyor 44. All of the conveyors 38, 42, 44 may be driven at approximately the same velocity. The tapes of the upper conveyor 44 may be vertically spaced from those of the lower conveyor 42 by approximately the thickness of the sets of sheets 16.

Disposed along the length of the conveyors 42, 44 are a pair of vacuum headers 46, 48. The upper vacuum header 46 is disposed just above the bottom tape of the upper conveyor 44 and the lower vacuum header 48 is disposed just below the upper tape of the lower conveyor 42. The details of the construction of these headers are discussed below in connection with the description of the subsequent figures. But it should be noted here that they each extend across the full width of the sheet 16 and each has an elongated opening 50 communicating between the inter-header space and the interior of the respective header. The openings 50 extend the full width of the sheet and are juxtaposed substantially in vertical register with each other. The narrow dimension or width of each of the elongated openings 50 is independently adjustable and in addition may be varied in width as a function of distance along the length of the header 50 to compensate for pressure drop along the length of the opening. The headers 46, 48 are coupled to a blower 52 by a duct 54. The blower 52 is energized or driven to provide a high degree of suction in each of the headers which in turn causes a high velocity flux of air to flow from the interheader space through the openings 50 into the headers, through the duct 54 and blower 52, and through a duct and refuse collector 56 containing a fine dust filter 58 (see FIG. 5) and which is connected to the output of the blower 52.

In the practice of the invention the opening 50 of the upper header 46 is adjusted to provide a greater flux of air in the upward direction than through the opening 50 of the lower header 48. In this manner a dead center in air movement across the cut ends of the sheet 16 is precluded. This extra flux in the upward direction tends to carry the sheets upwardly toward the upper header 46; however, it is highly undesirable for the sheet to contact the headers because such contact may damage or soil the highly finished surface of quality papers. The upward tendency is chosen and designed to be effectively counteracted by the downward force due to gravity. It is thereby seen that an unbalance is provided between the headers which precludes the dead center but which does not cause a net vertical displacement of the sheets. It is to be noted that in some instances it may be desired to adjust or provide the desired degree of unbalance by placing the upper header closer to the sheets than is the lower header.

In an operative example of the invention it was found that with an air flow of 748 cubic feet per minute in the upper header and 680 cubic feet per minute in the lower header with a static pressure provided of 15″ of water, all dust, sizing, fuzz, and fibers, including microscopic particles, were removed from the top and all edges of the sheets; and the sheets suffered no appreciable vertical displacement toward the upper header. In addition all dust was removed from the tapes and from between the tapes and the sheet.

Disposed immediately subsequently to the conveyors 42, 44 in this example is a tape conveyor 60, the horizontal conveying line of which is slightly below that of the conveyors 42, 40. An upper cooperating conveyor 62 may be juxtaposed continguously to the lower conveyor 60. The velocity of travel of the conveyor 60, 62 may be considerably less than that of the conveyors 42, 44 by a factor of 30 to 50 percent, whereby as a set of sheets 16 is exhausted from the conveyors 42, 44 it drops on top of a portion of the previous set of sheets 16 which have been decelerated. Thus the adjacent sheets are partially overlapped and thereby automatically prepared for stacking into the large stack 20. An additional advantage in the slower speed of the conveyors 60, 62 is that the sheets 16 impact against the backboard 64 of the stacker at a slower speed and thereby lower the probability of edge damage to the sheets as they are stacked. The body of the stacker may be lowered as the stack 20 is built up to aid further in stacking step and minimize sheet damage.

In operation the slitter knives 26, when employed, and the sheeting knives 34, 32 create the microscopically fine dust and powder and exploded fiber and deposits some of it on the surface and cut edges of the sheet 16. As the sheets pass between the vacuum headers 46, 48 they are gapped along their direction of travel by the action of the higher velocity tape conveyors 38, 42, 44 to permit air flow over all the cut edges and particularly over the sheet ends to clean the cutter dust created by the high impact sheeting knives. The cutting dust as well as all other dust and refuse is forced through the headers 46, 48, the duct 54, the blower 52, and into the collector 56. The cleaned sheets are then stacked by the layboy 18.

It is to be noted in connection with FIG. 1 that the particular overlapping type of layboy employed as well as the particular combination of sheeting knives are shown as examples only of means to perform the indicated functions. For example, it is sometimes desirable to employ two revolving knives instead of one revolving knife and one stationary knife; but it is not deemed necessary to a clear understanding of the invention to describe in detail all such other aspects and embodiments.

Referring to FIG. 2 an enlarged view of the vacuum headers 46, 48 with an exaggerated vertical separation between them illustrates a typical configuration of the adjustable openings 50 and a duct 54'. Each header is basically in the form of an elongated right parallelepiped with an open end 66 which may be secured, as by welding, to a plenum 67 which couples the header to the duct 54'. The opposing faces of the parallelepipeds are each provided with a longitudinal opening 50, the width and the shape of which may be determined by an occluding plate 68. The plate 68 is secured to the surface of the header 48, for example, by a plurality of machine screws 70 which pass through slots 72 in the plate 68. The slots 72 have an axis of elongation which is disposed at a slight angle, approximately 15°, for example, with respect to the length of the plate. Affixed at one end of the plate is a socket 74 in which the non-threaded end of a plate adjusting screw 76 is inserted and retained. By means of a retaining shoulder, not shown, the end of the screw 76 is free to rotate within the socket 74 but is precluded from axial motion with respect thereto. Thus the longitudinal position of the screw 76 determines the longitudinal position of the plate 68 which, by virtue of the inclined slots 72 and the screw 70, in turn, determines the transverse position of the plate 68 and thereby the width of the opening 50.

A bracket 78 is affixed to the end of each header and is threaded to receive and hold the screw 76. Thus as the screw is rotated it is driven longitudinally with respect to the header to control the width of the opening 50. The bracket 78 in this example is secured to the header by two screws 80 which each pass through a slot 82 in the bracket 78. These slots permit the necessary lateral translation of the screw 76 as the socket 74 is moved transversely to the length of the header.

These and other details of the headers are illustrated more clearly in FIG. 3 and FIG. 4 which are views of headers similar in most respects to those of the previous figures. To best illustrate the relationship of the elements shown in FIGS. 3 and 4 to those of FIGS. 1 and 2, like reference numerals are used to designate the similar, but not necessarily identical, elements.

The sectional view of FIG. 3 is taken through a header 48 between two of the screws 70. In order to streamline the opening 50 a circular cylindrical rod 84 may be welded along the length of the elongated slot 86 in the top of the header and the fillets 88 added. The occluding plate 68 may be similarly streamlined at the opposite edge of the opening 50 with a smaller diameter second circular rod 90. Each of the rods 84 and 90 is disposed so that the vertical edges of the opening 50 are tangent to the rods and so that both rods extend to approximately the same distance toward the paper sheet 16.

Referring to FIG. 4 the headers 46, 48 are shown in end elevation to illustrate the brackets 78 and their relationship to the adjusting screws 76 and occluding plates 68. The streamlining rods 84, 90 are shown in part. In addition a portion of an adjustable support 92 is illustrated. Each of the headers 46, 48 is secured to the support 92 by a screw 94. The endless fabric tapes may thus be inserted into the inter-header space, by the removal of the screws 94; and the assembly may be held rigidly by the replacement of the screws through the support 92.

Referring to FIG. 5, the dust and refuse collector 56 is shown in longitudinal section to illustrate the arrangement of baffles therewithin for collecting scraps of paper or relatively large refuse which is cleaned from the sheets 16. The collector 56 is provided with an opening 96 at its right hand end as viewed in the drawing. The opening 96 is coupled to the blower 52, see FIG. 1, and is the input to the collector. A plurality of baffle plates 100 are disposed transversely to the horizontal length of the collector 56 to provide adjacent openings therealong which are disposed toward opposite surfaces of the collector 56. In the direction from the input to the output of the collector 56 the baffles are preferably made progressively shorter and spaced further apart in order best to collect larger refuse without excessively impeding the flow of air through the output filter 58 at the left hand end of the collector 56. It should be noted that this arrangement of baffles provides a considerable variation in the velocity of the air in the different regions of the collector. This velocity variation causes differently weighted particles to drop out of the air current in different regions of the filter box; specifically, the heavier particles or scraps of paper fall out near the input end of the box where the velocity is relatively high, while the finer particles remain suspended in the current of air and are carried on to the filter element 58. In this manner the filter element does not become clogged by the larger scraps of paper. The filter 58 may be a permanent, cleanable fine mesh filter or it may be a replaceable element type filter.

There has thus been disclosed an example of the invention which achieves a cleaning of the sheeted and slitted paper so as to avoid the printing and other difficulties discussed above. In addition the dust collector and method are relatively inexpensive and adaptable to most cutting machines with no, or at most, only minor alterations in the tape conveyors because the headers may be small enough in their lateral dimensions to be fitted within the periphery of the endless tape conveyors

What is claimed is:

1. In a cutting machine for cutting paper into sheets from a continuous, multisheet web and conveying the cut sheets along a path having a horizontal portion to a layboy for stacking the sheets, a cutting dust removal system comprising:

a fabric endless tape conveyor system having first and second sections for transporting the cut sheets to and along the layboy stacking means;

velocity control means for causing said first section to convey said cut sheets at a higher velocity than said web to provide gaps between adjacent cut sheets at a predetermined location on said horizontal portion of said path;

upper and lower vacuum headers disposed in vertical alignment contiguously above and below, respectively, said cut sheets at said location, said headers each comprising an enlongated housing extending across the full width of said sheets, said housing having an elongated wall portion exposed toward said location of said path, said wall portion being ported along its length for substantially the full width of said sheets to provide air flow communication betwen the interior of said housing and said location, and at least one of said headers including an elongated, partially occluding member disposed on said ported wall portion to form, in cooperation therewith, an elongated, adjustable width slit shaped opening along the length of said wall portion;

mounting means for securing said headers closely contiguously to but not in contact with said cut sheets;

and air pump means coupled to said headers to provide a reduced pressure therein thereby to cause a suction cleaning action in said location whereby said suction cleaning action due to said upper header tends to pull said sheets upwardly and said suction cleaning action due to said lower header tends to pull said sheets downwardly, said occluding member defining air flow control means for causing said suction action of one of said headers to be greater than that of the other said header whereby there is a flow of air toward said one header across the entire expanse of said gaps between the ends of said cut sheets in said location between said headers.

2. Cutting dust removal system for use in combination with a cutting machine for cutting paper into sheets from a continuous web and conveying the cut sheets along a path having a horizontal portion to a layboy for stacking the sheets, said cutting dust removal system comprising: a fabric endless tape conveyor system having first and second sections for transporting the cut sheets to and along the layboy stacking means, velocity control means for causing said first section to convey said cut sheets at a higher velocity than said web to provide gaps between adjacent cut sheets in a predetermined region of said horizontal portion of said path, upper and lower vacuum headers disposed in vertical alignment contiguously above and below respectively said cut sheets in said region, said headers each comprising, an elongated housing extending across the full width of said sheets, said hosuing having an elongated wall portion exposed toward said region of said path, said wall portion being relieved along its length for substantially the full width of said sheets to provide air flow communication between the interior of said housing and said region, an elongated plate member disposed on and partially occluding said relieved wall portion to form an elongated slit shaped opening along the length of said wall portion, mounting means for securing said headers closely contiguously to but not in contact with said cut sheets, high velocity air pump means coupled to said headers to provide a reduced pressure therein thereby to cause a suction cleaning action in said region whereby said suction cleaning action of said upper header tends to pull said sheets upwardly and said suction cleaning action of said lower header tends to pull said sheets downwardly, said elongated slit shaped opening of said upper header being wider than that of said lower header for causing said suction action of said upper header to be greater than that of said lower header whereby there is an upward flow of air between said headers in said region.

3. Method of removing cutter dust from sheets of paper being conveyed from a sheeting cutter to a layboy stacking system comprising the steps of:

horizontally conveying the cut sheets at a faster speed than that of the uncut web thereby forming gaps between successive cut sheets in the direction of their travel past a cleaning location;

exerting, by vacuum cleaning the full width of the top surface and full expanse of the cut ends of the sheets with a first suction action at said cleaning location, an upward force on the paper sheets as they are conveyed past said cleaning location;

exerting, by vacuum cleaning the full width of the bottom surface of the cut sheets with a second suction action at said cleaning location simultaneously with said first suction action, a downward force on said sheets of a magnitude which in combination with that due to gravity, acting also downwardly, on the sheets compensates for and substantially counterbalances, with respect to vertical displacement of said sheets at said location, said upward force exerted on said sheets by said first suction action;

and removing cutter dust from the cut ends of the sheets, when the gap between successive sheets along said direction of travel is in said cleaning location, by means of the upward vacuum cleaning force whose magnitude is greater than the lower vacuum cleaning force in the area of the gap by the weight of an individual sheet due to gravity.

4. The method of removing cutter dust from multisheet packets of cut paper being conveyed from a high speed cutter to a stacking device comprising the steps of:

conveying the multisheet packets in a longitudinally gapped relation along a predetermined path through a cleaning region;

providing by suction a first current of cleaning air throughout the gaps between successive ones of said multisheet packets over their cut ends;

providing by suction a second current of cleaning air in said cleaning region, said first and second currents being directed in opposite senses, along substantially the same plane transverse to said predetermined path, and said currents extending transversely over the entire width of the cut ends of said multisheet packets in said cleaning region;

and adjusting the relative magnitudes of air flow in said currents whereby there is no dead air space in said gaps in said cleaning region.

References Cited by the Examiner

UNITED STATES PATENTS

| | | | |
|---|---|---|---|
| 1,417,052 | 5/1922 | Gasteiger | 55—442 X |
| 1,926,306 | 9/1933 | Pettersen | 15—306 |
| 1,947,748 | 2/1934 | Van Wormer | 15—308 |
| 1,985,157 | 12/1934 | Friedman et al. | 55—320 X |
| 2,138,178 | 11/1938 | Lang | 34—156 X |
| 2,142,711 | 1/1939 | Birch | 15—306 |
| 2,164,174 | 6/1939 | Gerard et al. | 15—307 |
| 2,213,233 | 9/1940 | Tigner | 55—320 X |
| 2,261,967 | 11/1941 | Matthews | 83—26 |
| 2,379,682 | 7/1945 | Colucci et al. | 83—110 X |
| 2,682,116 | 6/1954 | Dungler | 34—156 X |
| 2,852,311 | 9/1958 | Alexeff | 15—418 X |
| 2,884,711 | 5/1959 | Parkes | 34—156 |
| 2,956,301 | 10/1960 | Bruno | 15—306 |
| 3,045,273 | 7/1962 | Bruno | 15—306 |
| 3,088,353 | 5/1963 | Hanington | 83—100 |

FOREIGN PATENTS 291,920  6/1928  Great Britain.

MORRIS O. WOLK, *Primary Examiner.*

CHARLES A. WILLMUTH, DONALL H. SYLVESTER,
*Examiners.*

W. BAGGAT, J. T. ZATARGA, *Assistant Examiners.*